P. J. STALEC.
HYDRAULIC IRRIGATING MACHINE.
APPLICATION FILED APR. 20, 1914.

1,156,024.

Patented Oct. 5, 1915.
5 SHEETS—SHEET 1.

WITNESSES:

INVENTOR
Paul J. Stalec
BY
ATTORNEY

P. J. STALEC.
HYDRAULIC IRRIGATING MACHINE.
APPLICATION FILED APR. 20, 1914.

1,156,024.

Patented Oct. 5, 1915.
5 SHEETS—SHEET 2.

WITNESSES:
F. C. Matheny
O. Johnson

INVENTOR
Paul J. Stalec
BY
C. D. Haskins
ATTORNEY

P. J. STALEC.
HYDRAULIC IRRIGATING MACHINE.
APPLICATION FILED APR. 20, 1914.
1,156,024.
Patented Oct. 5, 1915.
5 SHEETS—SHEET 3.
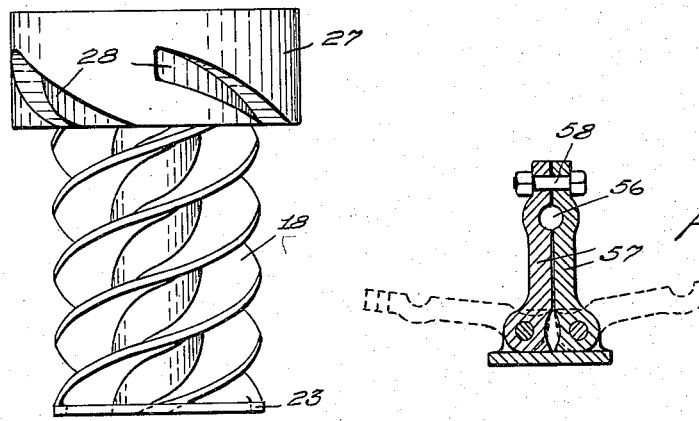
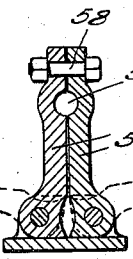
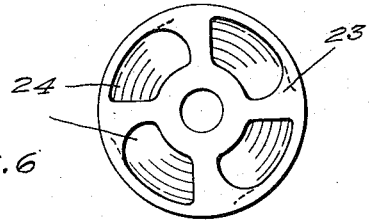
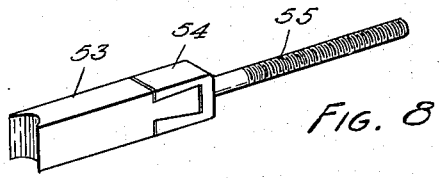
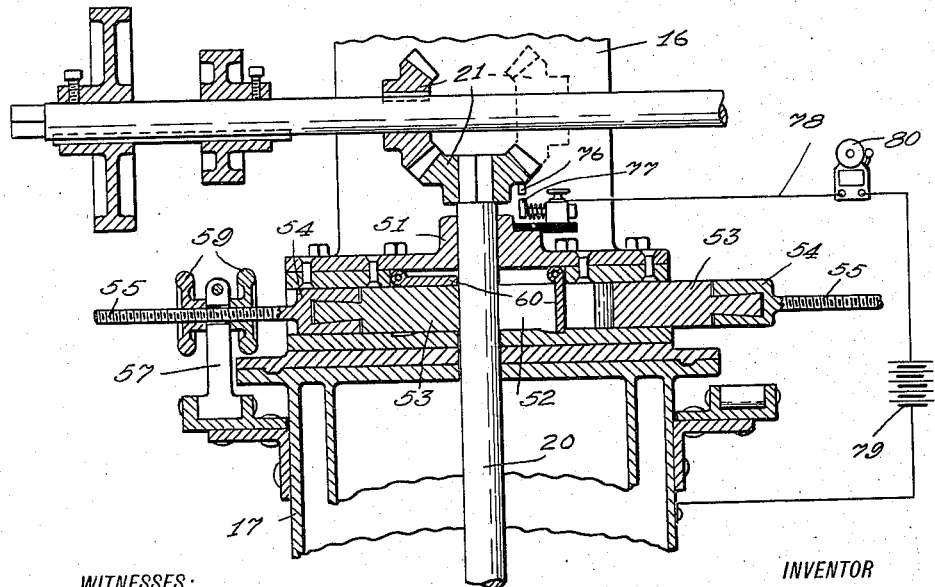
WITNESSES:
INVENTOR
Paul J. Stalec
BY
ATTORNEY

P. J. STALEC.
HYDRAULIC IRRIGATING MACHINE.
APPLICATION FILED APR. 20, 1914.

1,156,024.

Patented Oct. 5, 1915.
5 SHEETS—SHEET 4.

WITNESSES:
F. C. Mathuny
O. Johnson

INVENTOR
Paul J. Stalec
BY
C. D. Haskins
ATTORNEY

P. J. STALEC.
HYDRAULIC IRRIGATING MACHINE.
APPLICATION FILED APR. 20, 1914.

1,156,024.

Patented Oct. 5, 1915.
5 SHEETS—SHEET 5.

WITNESSES:
F. C. Matheny
O. Johnson

INVENTOR
Paul J. Stalec
BY
C. D. Haskins
ATTORNEY

UNITED STATES PATENT OFFICE.

PAUL J. STALEC, OF SEATTLE, WASHINGTON.

HYDRAULIC IRRIGATING-MACHINE.

1,156,024.      Specification of Letters Patent.      Patented Oct. 5, 1915.

Application filed April 20, 1914. Serial No. 833,193.

*To all whom it may concern:*

Be it known that I, PAUL J. STALEC, citizen of the United States, residing at Seattle, in the county of King and State of Washington, have invented a certain new and useful Improvement in Hydraulic Irrigating-Machines, of which the following is a specification.

My invention relates to improvements in hydraulic machines which are adapted for use in the operation of raising water from a river or other body of water to irrigate adjacent land, and the object of my improvements is to provide hydraulic mechanisms which shall be adapted to operate efficiently to raise water from a lower level to a higher level and which shall be simple in its plan of construction, reliable in its operation and adapted to be operated by any convenient source of power. I attain this object by devices illustrated in the accompanying drawings, in which—

Figure 1:
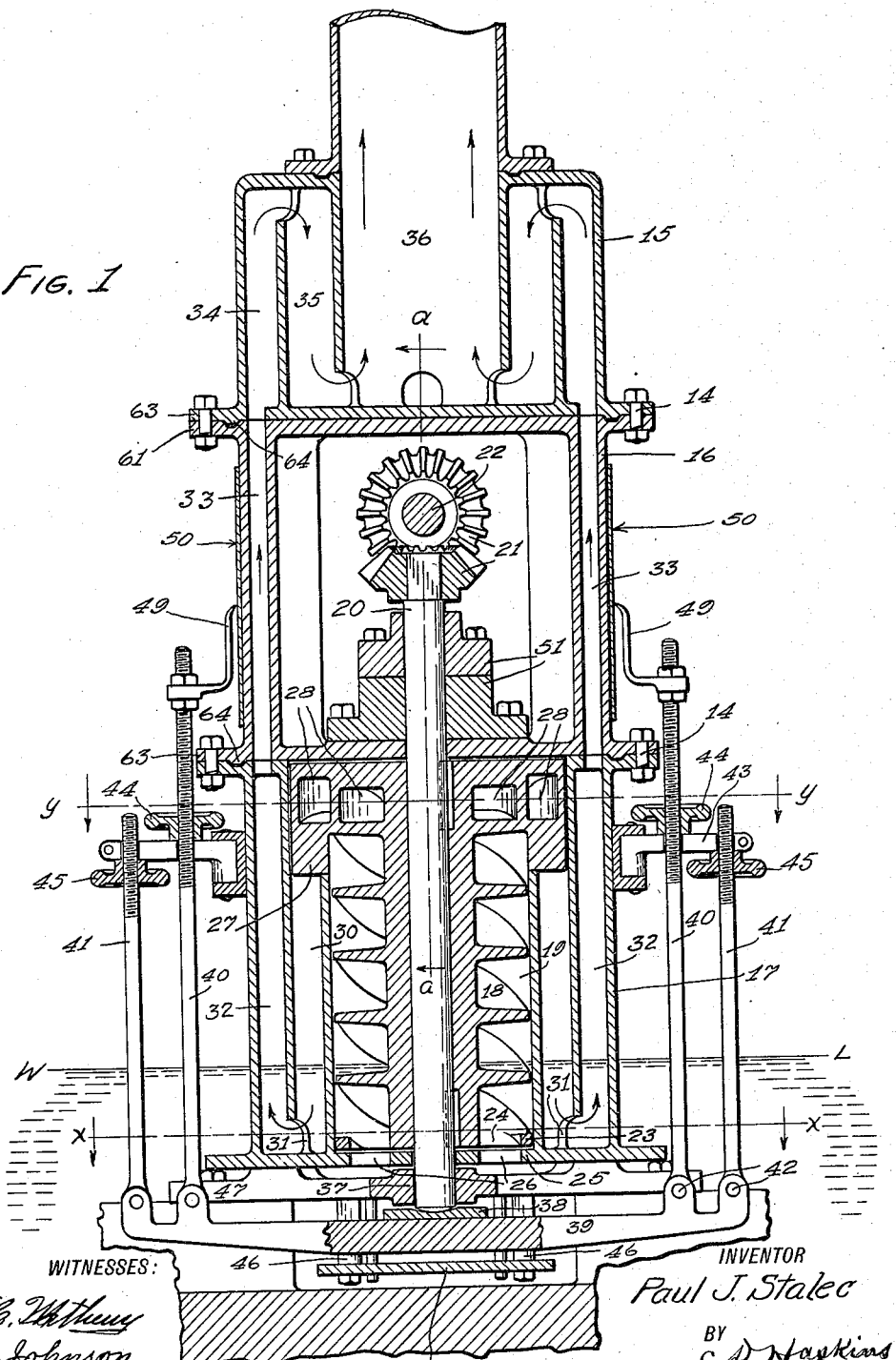
Figure 2:
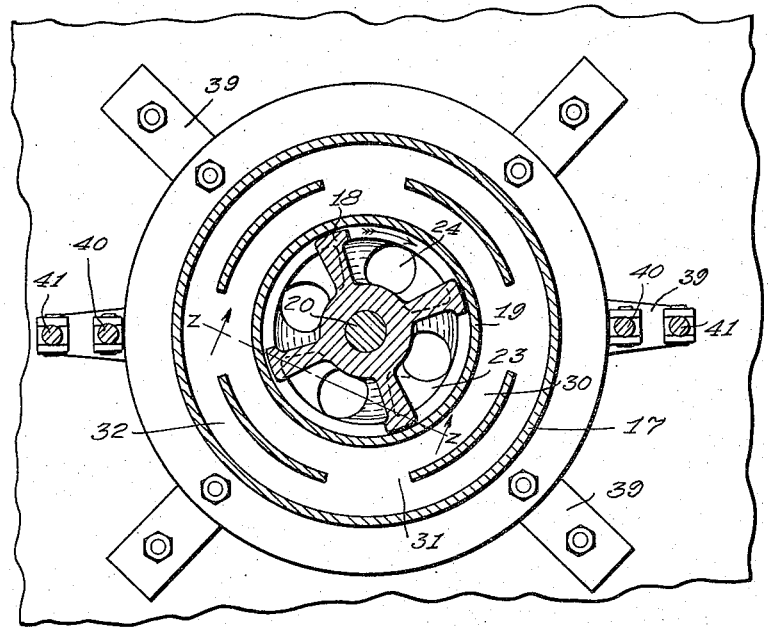
Figure 3:
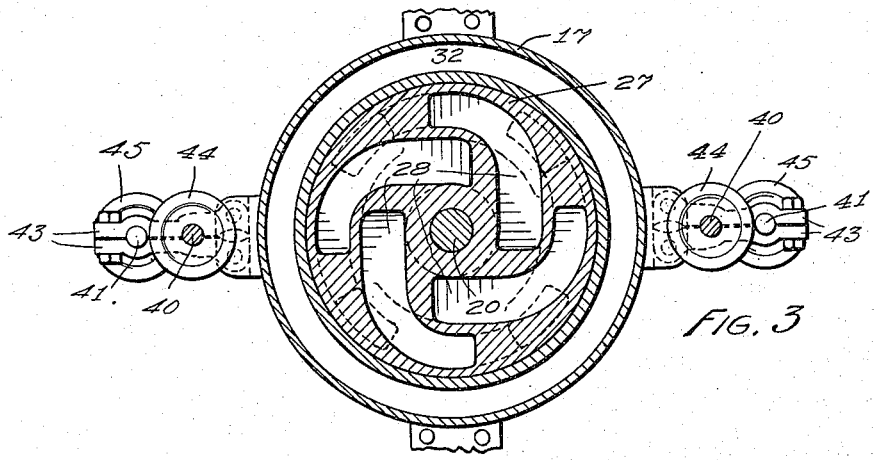
Figure 4:
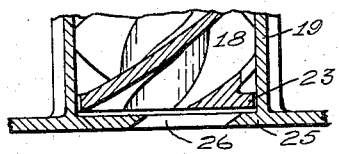
Figure 10:
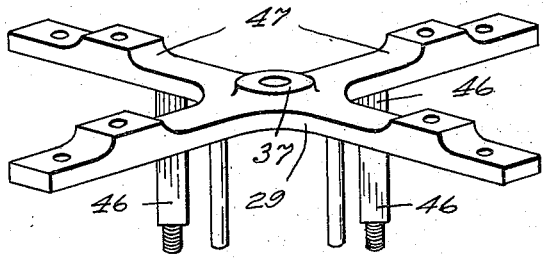
Figure 11:
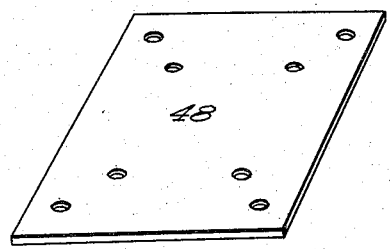
Figure 12:
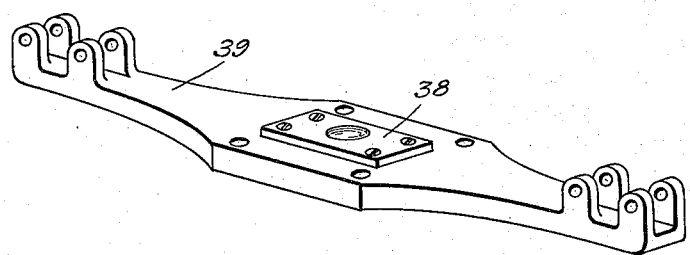
Figure 13:
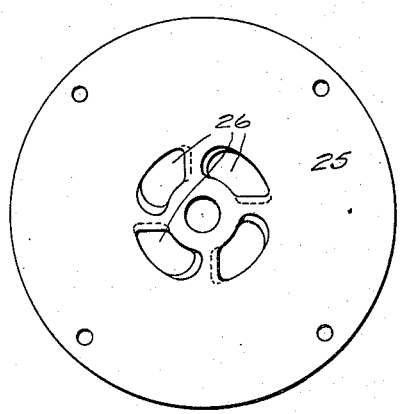
Figure 14:
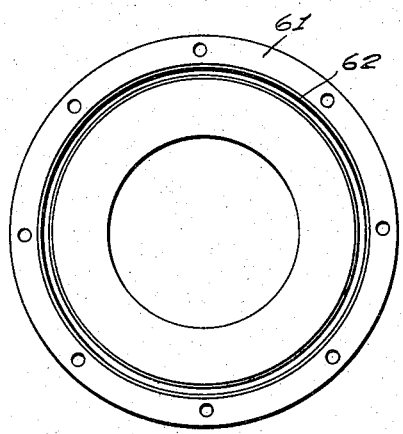
Figure 15:
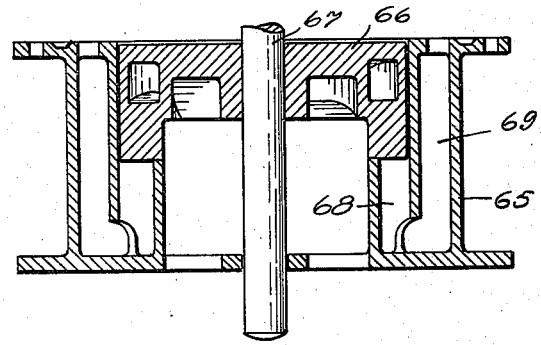
Figure 16:
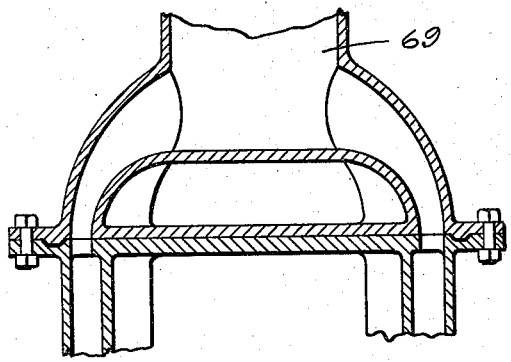
Figure 17:
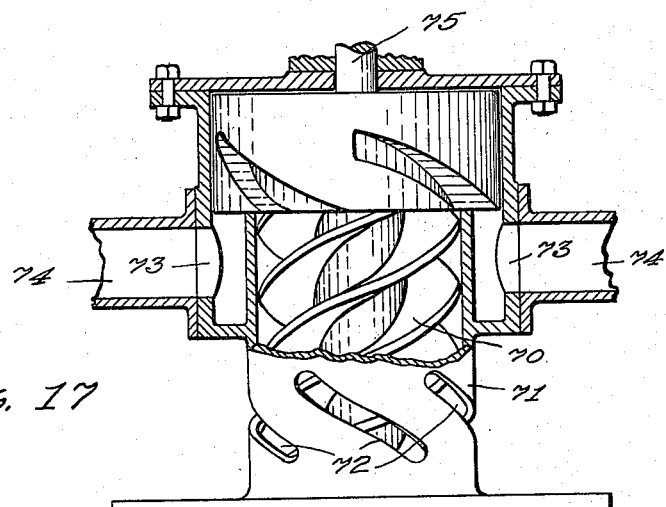

Figure 1 is a view in vertical mid-section of a structure embodying my invention; Fig. 2 is a view of the same in cross-section on broken lines $x$, $x$ of Fig. 1; Fig. 3 is a view of the same in cross-section on broken line $y$, $y$ of Fig. 1; Fig. 4 is a fragmentary view of the same in cross-section on broken line $z$, $z$ of Fig. 2; Fig. 5 is a view in side elevation of a propulsion screw embodied in my invention; Fig. 6 is a bottom plan view of the screw shown in Fig. 5; Fig. 7 is a view in vertical section of a detail of my invention; Fig. 8 is a view in perspective of a detail of my invention; Fig. 9 is a view in vertical section on broken line $a$, $a$ of Fig. 1, showing certain packing members that are associated with the main shaft of my machine; Fig. 10 is a view in perspective of a portion of the base frame of the same; Figs. 11 and 12 are views in perspective of details of my invention; Figs. 13 and 14 are plan views of details of my invention; and Figs. 15, 16 and 17 are sectional views of modified forms of various parts of my machine.

Referring to the accompanying drawings, throughout which like reference numerals indicate like parts, 15, 16 and 17 are three superposed sections of a machine embodying my invention which sections 15, 16 and 17 are secured together by bolts 14 that extend through suitable flanges provided on such sections, and 18 is a helicoidal water propelling screw that is disposed to fit within an innermost casing 19 of the lowermost section 17 and is secured to a shaft 20 that is adapted to be rotated by bevel gears 21, 21 that are connected by another shaft 22 with a suitable source of power (not shown) whereby the screw 18 may be rotated at a high velocity within the casing 19.

Upon the lowermost end of the screw 18 is formed an integral plate 23 that is provided with suitable holes 24, as more clearly shown in Figs. 4 and 6, through which water may enter, the plate 23 being disposed at a slight distance above the bottom 25 of the section 17 and such bottom 25 being provided with suitable holes 26 that are adapted to register with the holes 24 at certain times during the revolution of the plate 23 to permit water to pass upwardly through such holes 24 and 26 to the screw 18.

The top end of the screw 18 is provided with an enlarged integral head portion 27 that is formed with suitable discharge passageways 28 through which water may be discharged and such enlarged portion 27 is disposed to rest lightly upon the top of the inner casing 19, as more clearly shown in Fig. 1, in order that no water that has been discharged may find its way back into the screw 18.

The section 17 is adapted to be secured to any suitable form of base, as the base 29 that is more clearly shown in Fig. 10, and in the accompanying drawings the lower portion of such section 17 is shown to be submerged in water whereby when the screw 18 is rotated at a high velocity, in the direction indicated by the arrow in Fig. 2, water will be drawn in through the holes 26 and 24 and after passing the length of the screw will be discharged through the openings 28 into a passageway 30 that is provided in the walls of the lowermost section 17 the openings 28 being of a spiral shape and adapted to direct the discharge water downwardly and such water passing through openings 31 in the lower walls of the passageway 30 into another passageway 32 that is provided in the walls of the section 17 through which passageway 32 such water passes upwardly, as shown by arrows, into and through passageways 33 provided in the section 16 thence into and through passageways 34 and 35 provided in the top section 15 thence into a discharge pipe 36 which may extend to any point to which it is desired to conduct water.

The shaft 20 extends downwardly through the bottom of the section 17 and thence through a bearing 37 formed in the base portion of the machine and the lower end of such shaft is disposed to rest on a bearing plate 38 that is secured to a cross-bar 39 to form a thrust bearing for such shaft, the cross-bar 39 being adapted to be raised or lowered by threaded vertical shafts 40 and 41 that are articulated by pivots 42 with each end thereof and extend upwardly through brackets 43 that are secured to the side of the section 17, the shafts 40 each being provided with a handwheel 44 that is adapted to screw down on the top of the brackets 43 and the shafts 41 each being provided with a similar handwheel 45 that is adapted to screw upwardly against the lower side of such bracket 43, the purpose of having two shafts 40 and 41 on each end of the bar 39 being to take up any play that may exist in and about the pivots 42 and more rigidly to support the shaft 20.

The cross-bar 39 is further steadied in its position by passing between downwardly projecting studs 46 that are secured at suitable points to cross-bars 47 which form a portion of the base 29 of the machine the studs 46 being secured at their lower ends to a plate 48, more clearly shown in Fig. 1, and the shafts 40 on each side of the machine are provided on their top ends with pointers 49 that are adapted to point to graduated scales 50 that are secured on each side of the section 17 whereby the amount of raising or lowering of each end of the bar 39 may be accurately determined.

The section 16 is formed with passageways 33 on opposite sides, as shown in Fig. 1, there being openings between the walls that form the passageways 33 within which openings are disposed the gearwheels 21 and suitable bearing blocks 51 for the shaft 20.

The bearing blocks 51, more clearly shown in Fig. 9, are provided with recesses 52 on opposite sides of the shaft 20 to receive packing members 53, more clearly shown in Fig. 8, which packing members 53 are formed of suitable material and are secured by dovetail joints to the enlarged end 54 of a screw threaded adjusting shaft 55, which adjusting shaft 55 extends outwardly through a suitable hole 56 provided in a two-part pivotally mounted bracket 57, the two-parts of which bracket 57 are held together by a bolt 58 and are adapted to be spread apart, as shown by broken lines in Fig. 7, to permit the packing member 53 to be removed, the shaft 55 being provided on both sides of the bracket 57 with handwheels 59 that may be moved in either direction to move the packing members 53.

The top wall of each of the recesses 52 is provided at a point near the shaft 20 with a pivotally secured flap valve 60 that is adapted to drop down, as clearly shown in Fig. 9, to close the opening formed by such recess to prevent water from passing outwardly therethrough when the packing member 53 is removed, such flap valve 60 being adapted to be moved upwardly out of the way of the packing member 53 by pressure of the end of such member when it is thrust into the recess 52.

As packing members 53 are worn away by the shaft 20 they can be moved inwardly toward such shaft by adjusting the handwheels 59 and when such packing members 53 are completely worn out they may be removed and replaced by new ones, the valve 60 closing the recesses 52 when the packing members 53 are removed thus permitting such members to be removed and replaced while the machine is running.

In order to provide water tight joints between the sections 15, 16 and 17 I have provided in the top flange 61 of each of such sections an annular recess 62 and upon the bottom flange 63 of each of such superposed sections I have provided an annular ridge 64 that is adapted when the sections are in place, the one upon the other, to fit within such annular recess. A layer of thin packing material is so placed that it will be forced into the recess 62 by the ridge 64 to form a water tight joint when the sections are set up.

In Fig. 15 wherein I have illustrated a modified form of my invention, 65 is a casing within the upper portion of which is disposed a screw member 66 which has in its walls spirally formed openings or passageways similar to the passageways 28 in the enlarged head portion 27 of the screw 18, and which is secured to a shaft 67 similar to the shaft 20 and mounted in a similar manner whereby said screw member may be rotated to cause water within the casing 65 to move through such spiral grooves and be ejected from the outer ends thereof into a passageway 68 within the walls of the casing 65 from which passageway 68 such water passes into another passageway 69 and thence out of the top of the section 65 into any suitable discharge passageways (not shown).

In Fig. 16 I have shown a suitable form of discharge pipe 69 that may be connected with the top of the section 16 to take the place of the section 15 if desired, such discharge pipe 69 providing a more direct passageway for water that is discharged from the sections 15.

Fig. 17 illustrates by a view partly in vertical section and partly in side elevation another modified form of my invention wherein a screw 70 that is similar to the screw 18 is disposed within a casing 71 that is provided in its lower periphery with inlet openings 72 for liquid and in its upper portion with discharge openings 73 that are connected with suitable discharge pipes 74, the screw 70 being secured to a shaft 75 that is formed and mounted in the same manner as the shaft 18 whereby the screw 70 may be rotated at a high rate of speed to draw in water through the inlet openings 72 and expel such water through the discharge pipes 74.

In Fig. 9 I have illustrated an alarm device that may be connected with the gear-wheel 21 and the bearing block 51 to give a signal when the screw 18 is too low in the casing 19 thus to cause the bottom plate 23 of such screw to engage and wear the bottom surface of such casing; such device comprising a contact member 76 that is secured to the lower side of the gearwheel 21 and which is adapted to engage with another contact member 77 to close an electrical circuit 78 when such gearwheel 21 has been lowered sufficiently by wearing of the shaft 20 in the bearing plate 38 to permit the plate 23 to touch the bottom of the casing 19, the electrical circuit being energized by a suitable electric generator 79 and having connected therewith an electric bell 80 that is adapted to ring when the circuit is closed.

Manifestly my invention may be employed in connection with conduits for various fluids, both gaseous and liquid through which conduits it is desired to maintain a flow of such fluids.

Obviously numerous changes in the form of construction of the various parts embodied in my machine may be resorted to without departing from the spirit of my invention or sacrificing any of its advantages.

What I claim is:

1. In a machine of the class described, the combination with a vertically disposed and suitably supported cylindrical casing which is provided with an inlet passageway for fluid in its lower portion and with an outlet passageway in its upper portion, and a fluid passage-way between its upper and lower portions of a shaft disposed concentrically within said casing and mounted to be rotatable in suitable bearings associated with said casing; an end thrust-bearing disposed exteriorly of the casing a helicoidal propeller screw mounted securely on said shaft within said casing and adapted to extend from said inlet passage-way to said outlet passage-way, and arms linked at one end to said thrust bearing and adjustably connected at their other ends to said casing to adjust said shaft with respect to its vertical position.

2. In a machine of the class described, the combination with a suitably supported and vertically disposed cylindrical casing which is provided with passageways for fluid in its lower and upper portions, of a shaft mounted to be rotatable in suitable bearings associated with said casing and disposed with its axis concentric with the inner surface of the cylindrical wall of said casing and extending below said casing, an end thrust bearing for said shaft; a helicoidal propeller screw securely mounted on said shaft within said casing and provided on its upper end with a head and on its lower end with a disk having openings through the head and disk for the passage of fluid and adapted to extend from the lower one of said passageways to the upper one thereof; means for communicating rotary motion to said shaft and arms linked at one end to said thrust bearing and adjustably connected at their other ends to said casing to adjust said shaft with respect to its vertical position.

3. In a machine of the class described, the combination with a casing that is provided with inlet openings in its bottom, of a helicoidal propeller screw disposed within said casing, said screw being provided on its lower end with a flat disk having openings therein adapted when said screw is rotated to register with said inlet openings in said casing whereby liquid may enter through said openings and be conveyed upwardly by said screw; a head formed on the upper end of said casing said head being provided with spiral discharge passageways that connect with said screw through which water may be discharged; a bearing shaft connected with said screw, means for rotating said bearing shaft, a thrust bearing for the lower end of said shaft, and arms linked at one end to said thrust bearing and adjustably connected at their other ends to said casing to adjust said shaft with respect to its vertical position.

4. In a machine of the class described, the combination with a plurality of superposed casings which are provided with passageways leading through said casings from one to another; of a screw propeller disposed in the lowermost one of said casings; means for conducting fluid to said lowermost casing; a head provided on the top end of said screw propeller, said enlarged portion being provided with spiral passageways that extend between said screw and the upper passage-way in the lowest one of said casings whereby fluid from said screw may be discharged into said upper passageway in said lowest casing with transversely adjustable packing devices associated with said shaft intermediate the ends thereof; means for rotating said shaft, a thrust bearing for the lower end of said shaft, and arms linked at one end to said thrust bearing and adjustably connected at their other ends to said casing to adjust said shaft with respect to its vertical position.

5. In a machine of the class described, the combination with a casing that is provided with inlet and outlet openings, of a conveyer screw adapted to fit within said casing; a shaft upon which said conveyer screw is mounted; a vertically adjustable step bearing for the lower end of said shaft; means adapted to rotate said shaft; and a packing box for the upper end of said shaft said packing box being provided with removable packing members which are adapted to be removed while said machine is in motion.

6. In a machine of the class described, the combination with a vertically disposed cylinder that is provided with inlet openings, of a helical conveyer screw disposed to rotatably fit within said cylinder, the lower end of said conveyer screw being in close proximity to the bottom of said cylinder; a shaft upon which said conveyer screw is mounted; an end bearing for said shaft; a support for said end bearing; means for raising and lowering said support to adjust said conveyer screw vertically within said cylinder; and indicators to register the amount of vertical movement of said support.

7. In a machine of the class described, the combination with a vertically disposed cylinder having a plurality of holes provided in its bottom end; of a conveyer screw disposed within said cylinder said conveyer screw having an integral plate provided on its bottom end and said plate being formed with a plurality of openings that are adapted at certain times when said conveyer screw is revolved to register with said holes in the bottom of said cylinder through which holes fluid may enter the space between the fins of said screw; and means for rotating said screw.

8. A rotary pump of the class described, embodying a vertically disposed cylindrical casing, a shaft mounted in suitable bearings associated with said casing and disposed therein concentrically with the inner surface of the circumferential wall of said casing; a vertically adjustable end bearing adapted to engage with the surface of the bottom end of said shaft said adjustable end bearing being fixed to a vertically movable cross-bar; guides disposed to adapt them to guide said cross-bar in its vertical movement; a pair of adjusting rods articulated to each of the end portions of said cross-bar and disposed to extend upwardly therefrom one of said adjusting rods being longer than the other thereof; suitably supported brackets disposed in a fixed relation to said cylindrical casing, two on each of opposite sides thereof and adapted to guide a different one of said pairs of adjusting rods in their vertical movements; and screw-threaded nuts associated with said rods and said brackets and adapted to be turned to raise and lower said rods and said cross-bar.

9. In a machine of the class described, the combination with a casing having inlet and outlet openings in the lower and upper ends thereof, of a pair of spaced bearing blocks disposed upwardly of the casing, a conveyer screw within said casing, a supporting shaft for said screw extending through said bearing blocks, transversely adjustable packing members positioned between said blocks adapted to engage said shaft, and hinged flap valves adapted to be engaged by said packing members when said packing members are in operative position, said flap valves adapted to be moved to operative position to close the space caused by the removal of the packing members to permit the machine to continue operation.

10. In a machine of the class described, the combination with a casing, of a conveyer screw within said casing, a vertical shaft to which said screw is fixed, driving means associated with the upper end of said shaft, an adjustable transverse member constituting a support for the lower end of said shaft, said member comprising a horizontal arm, screw rods articulated to each end thereof, brackets carried by said casing through which said screw rods extend, means associated with said rods for adjusting the same, and means associated with some of said rods to indicate the amount of vertical movement of said shaft.

11. In a machine of the class described, the combination with a casing, of a conveyer screw arranged therein, a supporting shaft for said screw, transversely adjustable members associated with said casing, packing members for said shaft carried by the transversely adjustable members, and means carried by said casing made operative to prevent leakage when said packing members are removed from said casing.

12. In a machine of the class described, the combination with a plurality of superposed casings having fluid communicating passage-ways, of a conveyer screw arranged in the lowermost casing, a vertical supporting shaft for said casing, a driving shaft associated with the upper end of said supporting shaft extending through and positioned transversely of the middle casing, supporting means for the lower end of said shaft, lateral brackets carried by the lower casing and rods having their upper ends adjustably mounted in said brackets and pivotally connected at their lower ends to said shaft supporting means for varying the vertical position of the shaft.

In witness whereof I hereunto subscribe my name this seventh day of April A. D., 1914.

PAUL J. STALEC.

Witnesses:
  FELIX BROWN,
  F. C. MATHEUY.